US012711940B2

(12) United States Patent
Nosrati et al.

(10) Patent No.: US 12,711,940 B2
(45) Date of Patent: Aug. 18, 2026

(54) LEARNABLE HEURISTICS TO OPTIMIZE A MULTI-HYPOTHESIS FILTERING SYSTEM

(71) Applicant: DOLBY LABORATORIES LICENSING CORPORATION

(72) Inventors: Hadis Nosrati, New South Wales (AU); Benjamin John Southwell, New South Wales (AU)

(73) Assignee: DOLBY LABORATORIES LICENSING CORPORATION

( * ) Notice: Subject to any disclaimer, the term of this patent is extended or adjusted under 35 U.S.C. 154(b) by 156 days.

(21) Appl. No.: 18/708,557

(22) PCT Filed: Nov. 1, 2022

(86) PCT No.: PCT/US2022/048607

§ 371 (c)(1),
(2) Date: May 8, 2024

(87) PCT Pub. No.: WO2023/086244

PCT Pub. Date: May 19, 2023

(65) Prior Publication Data

US 2025/0006170 A1 Jan. 2, 2025

Related U.S. Application Data

(60) Provisional application No. 63/369,311, filed on Jul. 25, 2022, provisional application No. 63/277,242, filed on Nov. 9, 2021.

(51) Int. Cl.
*G10K 11/178* (2006.01)
*G10K 11/34* (2006.01)
(Continued)

(52) U.S. Cl.
CPC ........ *G10K 11/17854* (2018.01); *G10K 11/34* (2013.01); *G10L 21/02* (2013.01);
(Continued)

(58) Field of Classification Search
CPC ............. G10K 11/17854; G10K 11/34; G10K 2210/3038; G10K 11/178; G10L 21/02;
(Continued)

(56) References Cited

U.S. PATENT DOCUMENTS 11,205,445 B1 * 12/2021 Sharma .............. H04N 21/4666
11,646,009 B1 * 5/2023 Chhetri .................. G10L 15/16
704/232

(Continued)

FOREIGN PATENT DOCUMENTS

JP 2002016691 A * 1/2002
WO 2020204525 A1 10/2020
WO 2020256257 A2 12/2020

OTHER PUBLICATIONS

English machine translation of JP-2002016691-A (Isaka, Takehiko; Echo Canceller; published Jan. 2002) (Year: 2002).*

(Continued)

*Primary Examiner* — Mark Fischer

(57) ABSTRACT

Some disclosed methods involve receiving microphone signals from a microphone system, including signals corresponding to one or more sounds detected by the microphone system. Some methods may involve determining, via a trained neural network, a filtering scheme for the microphone signals, the filtering scheme including one or more filtering processes. The trained neural network may be configured to implement one or more subband-domain adaptive filter management modules. Some methods may involve applying the filtering scheme to the microphone signals, to produce enhanced microphone signals.

17 Claims, 11 Drawing Sheets

(51) Int. Cl.
*G10L 21/02* (2013.01)
*G10L 21/0208* (2013.01)
*H04R 3/00* (2006.01)

(52) U.S. Cl.
CPC ....... *H04R 3/00* (2013.01); *G10K 2210/3038* (2013.01); *G10L 2021/02082* (2013.01); *H04R 2430/20* (2013.01)

(58) Field of Classification Search
CPC ............ G10L 2021/02082; H04R 3/00; H04R 2430/20; H04R 3/02; H04R 2410/05
See application file for complete search history.

(56) References Cited

U.S. PATENT DOCUMENTS

| | | | | |
|---|---|---|---|---|
| 2004/0141608 | A1* | 7/2004 | Imata | H04M 9/082 379/406.08 |
| 2016/0284346 | A1 | 9/2016 | Visser | |
| 2019/0172476 | A1* | 6/2019 | Wung | G10L 21/0232 |
| 2019/0222691 | A1 | 7/2019 | Shah | |
| 2020/0105287 | A1 | 4/2020 | Chang | |
| 2020/0312346 | A1 | 10/2020 | Fazeli | |
| 2023/0421952 | A1 | 12/2023 | Southwell | |

OTHER PUBLICATIONS

Felix et al., Learning to Forget: Continual Prediction with LSTM, published Sep. 1999, Artifical Neural Nerworks, Conference Publication No. 470, pp. 850-855 (Year: 1999).*

Anonymous: “Optimizing Siri on HomePod in Far-Field Settings”; Speech and Natural Language Processing; Dec. 2018; Jan. 1, 2019 (Jan. 1, 2019); pp. 1-12 (12 pages).

Haeb-Umbach, Reinhold et al.; “Speech Processing for Digital Home Assistants: Combining signal processing with deep-learning techniques”; IEEE Signal Processing Magazine; vol. 36; No. 6; Nov. 1, 2019 (Nov. 1, 2019); pp. 111-124 (14 pages).

Haubner, Thomas et al.; “End-To-End Deep Learning-Based Adaptation Control for Frequency-Domain Adaptive System Identification”; arxiv.org; Cornell University Library; Oct. 13, 2021 (Oct. 13, 2021); 5 pages.

Kostadinov, Simeon; “Understanding GRU Networks”; Towards Data Science; Dec. 16, 2017 (Dec. 16, 2017); pp. 1-7 (7 pages).

Lee, Wei-Jen et al.; “Speech Dereverberation Based on Integrated Deep and Ensemble Learning Algorithm”; IEEE; 2018; pp. 5454-5458 (5 pages).

Spanias, Andreas; “A Brief Survey of Time •and Frequency-Domain Adaptive Filters”; 2016 7th International Conference on Information, Intelligence, Systems & Applications (IISA); IEEE; Jul. 13, 2016 (Jul. 13, 2016); pp. 1-7 (7 pages).

* cited by examiner

LEARNABLE HEURISTICS TO OPTIMIZE A MULTI-HYPOTHESIS FILTERING SYSTEM

CROSS-REFERENCE TO RELATED APPLICATIONS

This application is a U.S. National Stage application under U.S.C. 371 of International Application No. PCT/US2022/048607, filed on Nov. 1, 2022 (reference: D21083WO01), which claims the benefit of priority from U.S. Provisional Patent Application No. 63/277,242, filed on Nov. 9, 2021, and U.S. Provisional Patent Application No. 63/369,311, filed on Jul. 25, 2022, all of which are incorporated herein by reference in their entirety.

TECHNICAL FIELD

This disclosure pertains to systems and methods for selecting and implementing audio filters, including but not limited to audio filters for acoustic echo cancellation (AEC), beam steering, active noise cancellation (ANC) or dereverberation.

BACKGROUND

Methods, devices and systems for selecting and implementing audio filters are widely deployed. Although existing devices, systems and methods for selecting and implementing audio filters provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker signal(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is a smart audio device, such as a "smart speaker," that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via apparatus. For example, one or more devices (e.g., a system that includes one or more devices) may be capable of performing, at least in part, the methods disclosed herein. In some implementations, an apparatus may be, or may include, an audio device having a microphone system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be configured for implementing some or all of the methods disclosed herein.

In some examples, the control system may be configured to receive microphone signals from the microphone system. The microphone signals may include signals corresponding to one or more sounds detected by the microphone system. According to some examples, the control system may be configured to determine, via a trained neural network, a filtering scheme for the microphone signals. In some examples, the filtering scheme may include one or more filtering processes. In some examples, the trained neural network may be configured to implement one or more subband-domain adaptive filter management modules. In some examples, the control system may be configured to apply the filtering scheme to the microphone signals, to produce enhanced microphone signals.

According to some examples, the control system may be configured to implement one or more multichannel, multi-hypothesis adaptive filter blocks. In some such examples, the one or more subband-domain adaptive filter management modules may be configured to control the one or more multichannel, multi-hypothesis adaptive filter blocks.

In some examples, the control system may be configured to implement a subband-domain acoustic echo canceller (AEC). In some such examples, the filtering scheme may involve an echo cancellation process.

In some implementations, the audio device also may include a loudspeaker system. According to some such implementations, the control system may be further configured to implement a renderer for producing rendered local audio signals and for providing the rendered local audio signals to the loudspeaker system and to the subband-domain AEC.

In some examples, the control system may be configured for providing reference non-local audio signals to the subband-domain AEC. In some such examples, the reference non-local audio signals may correspond to audio signals being played back by one or more other audio devices.

According to some examples, the control system may be configured to implement a noise compensation module. In some such examples, the filtering scheme may include, or may involve, a noise compensation process.

In some examples, the control system may be configured to implement a dereverberation module. In some such examples, the filtering scheme may include, or may involve, a dereverberation process.

According to some examples, the control system may be configured to implement a beam steering module. In some such examples, the filtering scheme may include, or may involve, a beam steering process.

In some examples, the control system may be configured to implement an automatic speech recognition module. In some such examples, the control system may be configured to provide the enhanced microphone signals to the automatic speech recognition module.

According to some examples, the control system may be configured to implement a telecommunications module. In some such examples, the control system may be configured to provide the enhanced microphone signals to the telecommunications module.

In some implementations, the trained neural network may be, or may include, a recurrent neural network. According to some such implementations, the recurrent neural network may be, or may include, a gated adaptive filter unit. In some such implementations, the gated adaptive filter unit may include a reset gate, an update gate and a keep gate. In some such implementations, the gated adaptive filter unit may include an adaptation gate.

According to some implementations, the audio device may include a square law module configured to generate a plurality of residual power signals based, at least in part, on the microphone signals. The square law module may, in some examples, be implemented by the control system. In some implementations, the square law module may be configured to generate the plurality of residual power signals based, at least in part, on reference signals that correspond to audio being played back by the audio device and one or more other audio devices. According to some implementations, the audio device may include a selection block configured to select the enhanced microphone signals based, at least in part, on a minimum residual power signal of the plurality of residual power signals. The selection block may, in some examples, be implemented by the control system.

In some implementations, the control system may be configured to implement post-deployment training of the trained neural network. The post-deployment training may, for example, occur after the audio device has been deployed and activated in an audio environment.

At least some aspects of the present disclosure may be implemented via one or more audio processing methods. In some instances, the method(s) may be implemented, at least in part, by a control system and/or via instructions (e.g., software) stored on one or more non-transitory media. Some methods may involve receiving microphone signals from a microphone system. The microphone signals may include signals corresponding to one or more sounds detected by the microphone system. Some such methods may involve determining (for example, via a trained neural network), a filtering scheme for the microphone signals. The filtering scheme may include one or more filtering processes. In some examples, the trained neural network may be configured to implement one or more subband-domain adaptive filter management modules. Some such methods may involve applying the filtering scheme to the microphone signals, to produce enhanced microphone signals.

Some methods may involve implementing (via a control system, for example, via a trained neural network implemented by the control system) the one or more multichannel, multi-hypothesis adaptive filter blocks. In some such examples, the method may involve controlling, by the one or more subband-domain adaptive filter management modules, the one or more multichannel, multi-hypothesis adaptive filter blocks.

Some methods may involve implementing (e.g., via the control system) a subband-domain acoustic echo canceller (AEC). In some such examples, the filtering scheme may involve an echo cancellation process. Some methods may involve implementing (e.g., via the control system) a renderer for producing rendered local audio signals. In some such examples, the method may involve providing the rendered local audio signals to a loudspeaker system and to the subband-domain AEC. Some methods may involve providing reference non-local audio signals to the subband-domain AEC. The reference non-local audio signals may correspond to audio signals being played back by one or more other audio devices.

According to some examples, the method may involve implementing (e.g., by the control system) a noise compensation module. In some such examples, the filtering scheme may include, or may involve, a noise compensation process.

In some examples, the method may involve implementing (e.g., by the control system) a dereverberation module. In some such examples, the filtering scheme may include, or may involve, a dereverberation process.

According to some examples, the method may involve implementing (e.g., by the control system) a beam steering module. In some such examples, the filtering scheme may include, or may involve, a beam steering process.

In some examples, the method may involve implementing (e.g., by the control system) an automatic speech recognition module. In some such examples, the method may involve providing the enhanced microphone signals to the automatic speech recognition module.

According to some examples, the method may involve implementing (e.g., by the control system) a telecommunications module. In some such examples, the method may involve providing the enhanced microphone signals to the telecommunications module.

According to some implementations, the method may involve generating (e.g., by a square law module implemented by the control system) a plurality of residual power signals based, at least in part, on the microphone signals. Some implementations may involve generating the plurality of residual power signals based, at least in part, on reference signals that correspond to audio being played back by the audio device and one or more other audio devices. According to some implementations, the method may involve selecting (e.g., by a selection block implemented by the control system) the enhanced microphone signals based, at least in part, on a minimum residual power signal of the plurality of residual power signals.

In some implementations, the method may involve implementing (e.g., by the control system) post-deployment training of the trained neural network. The post-deployment training may, for example, occur after an audio device configured to implement at least some disclosed methods has been deployed and activated in an audio environment.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
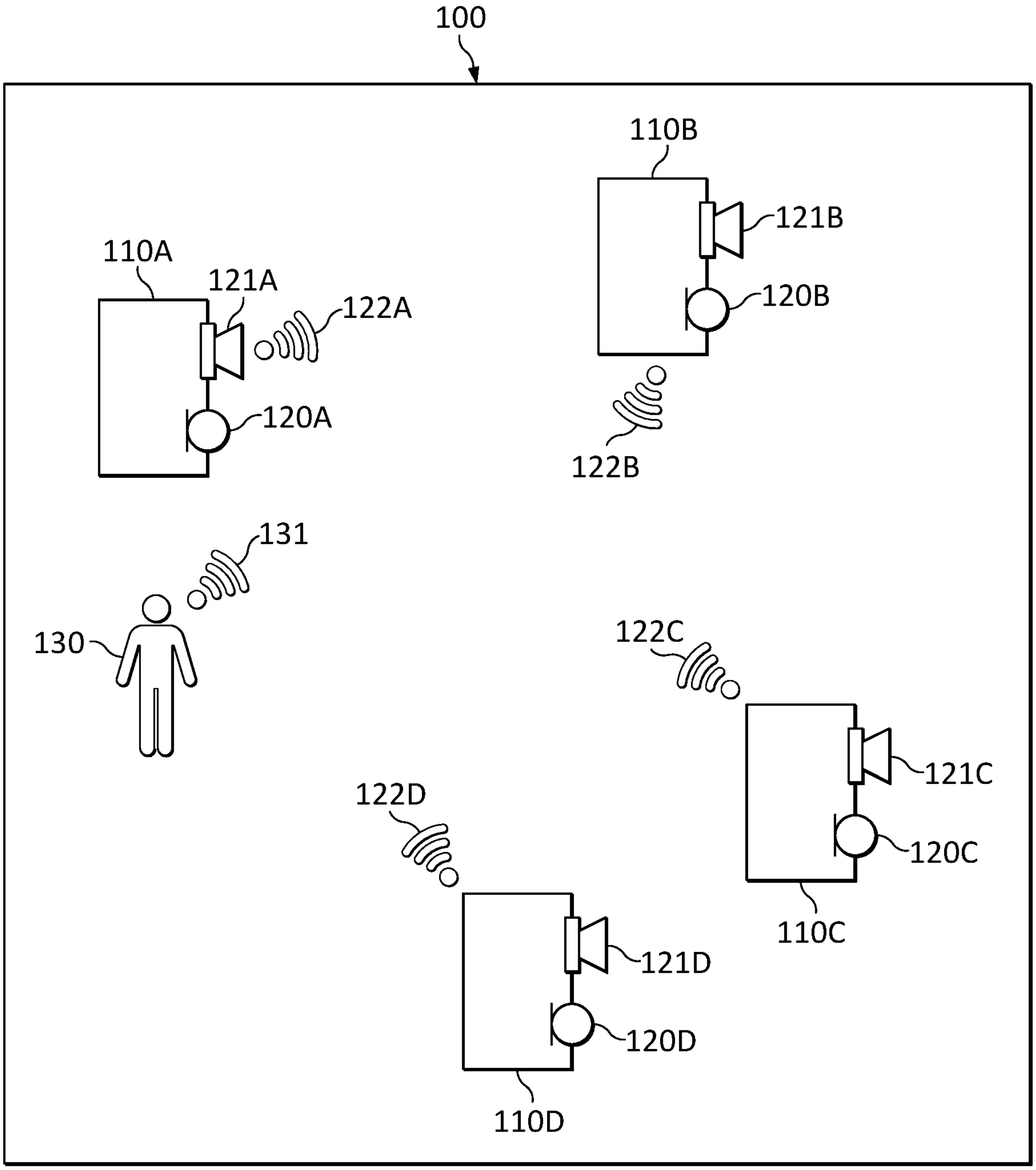
FIG. 1A shows an example of an audio environment.

Full duplex audio devices, such as smart speakers, perform both audio playback and audio capture tasks in order to provide functionality and features to one or more listeners in an audio environment. Many listening tasks employ the use of so-called "optimal filters," which also may be referred to herein as "filters" or "acoustic filters," to perform tasks such as acoustic echo cancellation (AEC), beam steering, active noise cancellation (ANC), dereverberation, etc. To build practical subsystems that realize these tasks, the optimal filters are typically supported, by means of control and aiding mechanisms, via heuristics that are manually designed and tuned by the system or product designer.

Some implementations disclosed in this document involve the use of machine learning to build neural networks that can automatically realize structure and tunings of heuristics to control and aid the filters. Some novel implementations of these machine learning algorithms in the form of recurrent neural networks called Gated Adaptive Filters (GAFs) are disclosed herein. In some disclosed examples, GAFs are curated for learning filter-related heuristics by controlling the flow of information over long sequences of data for each of a plurality of hypothesis filtering systems. In this context, a "long sequence of data" may be a sequence of data during a time interval of multiple seconds (such as 5 seconds, 10 seconds, 15 seconds, 20 seconds, 25 seconds, 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, etc.) or during a time interval of multiple minutes (such as 2 minutes, 3 minutes, 4 minutes, 5 minutes, 6 minutes, 7 minutes, 8 minutes, etc.). According to some such examples, GAFs can improve the learning of such heuristics because their gated nature of retain, adapt and reset of information is fully compatible with the control mechanism of filter coefficients in a multi-hypothesis adaptive filter scheme. In some such examples, a GAF-based multi-hypothesis adaptive filter scheme may be designed to optimize audio device performance responsive to disturbances in the audio environment.

Devices that are configured to listen during the playback of content will typically employ some form of echo management, such as echo cancellation and/or echo suppression, to remove the "echo" (the content played back by audio devices in the audio environment) from microphone signals. Any continuous listening task, such as waiting for a wakeword or performing any kind of "continuous calibration," should continue to function when audio devices are playing back content corresponding to music, movies, etc., and when audio device interactions (such as interactions between a person and an audio device that is implementing a voice assistant, at least in part) take place. In addition to this, active noise cancellation and or suppression along with beamforming and dereverberation technologies can further enhance the quality of the microphone signal for downstream applications.

FIG. 1A shows an example of an audio environment. As with other figures provided herein, the types and numbers of elements shown in FIG. 1A are merely provided by way of example. Other implementations may include more, fewer and/or different types and numbers of elements.

According to this example, the audio environment 100 includes audio devices 110A, 110B, 110C and 110D. In this example, each the audio devices 110A-110D includes a respective one of the microphones 120A, 120B, 120C and 120D, as well as a respective one of the loudspeakers 121A, 121B, 121C and 121D. According to some examples, each the audio devices 110A-110D may be a smart audio device, such as a smart speaker. In this example, the audio devices 110A-110D are configured to listen for a command or wakeword within the audio environment (100).

According to this example, one acoustic event is caused by the talking person 130, who is talking in the vicinity of the audio device 110A. Element 131 is intended to represent speech of the talking person 130.

Figure 1B:
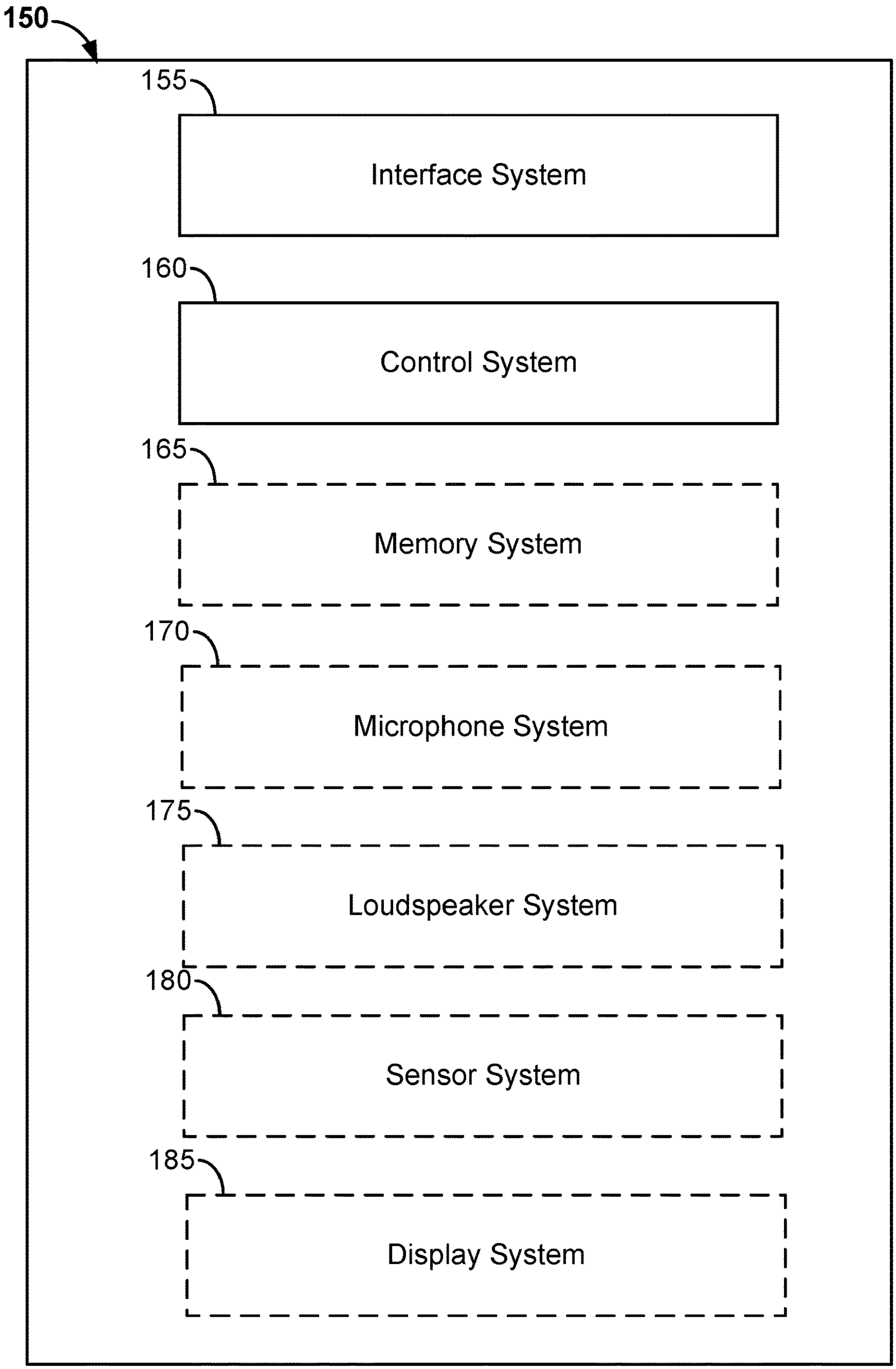
FIG. 1B is a block diagram that shows examples of components of an apparatus capable of implementing various aspects of this disclosure.

FIG. 1B is a block diagram that shows examples of components of an apparatus capable of implementing various aspects of this disclosure. As with other figures provided herein, the types and numbers of elements shown in FIG. 1B are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television or another type of device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata.

Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces. The interface system 155 may include one or more devices for implementing a user interface, such as one or more microphones, one or more speakers, a display system, a touch sensor system and/or a gesture sensor system. Accordingly, while some such devices are represented separately in FIG. 1B, such devices may, in some examples, correspond with aspects of the interface system 155.

In some examples, the interface system 155 may include one or more interfaces between the control system 160 and a memory system, such as the optional memory system 165 shown in FIG. 1B. However, the control system 160 may include a memory system in some instances. The interface system 155 may, in some implementations, be configured for receiving input from one or more microphones in an environment.

The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

In some implementations, the control system 160 may be configured for performing, at least in part, the methods disclosed herein. According to some examples, the control system 160 may be configured to receive microphone signals from a microphone system. The microphone signals may include signals corresponding to one or more sounds detected by the microphone system. In some such examples, the control system 160 may be configured to determine, via a trained neural network, a filtering scheme for the microphone signals, the filtering scheme including one or more filtering processes. In some such examples, the trained neural network may be configured to implement one or more subband-domain adaptive filter management modules. In some examples, the control system 160 may be configured to implement the trained neural network. According to some examples, the control system 160 may be configured to implement one or more multichannel, multi-hypothesis adaptive filter blocks. In some such examples, the one or more subband-domain adaptive filter management modules may be configured to control the one or more multichannel, multi-hypothesis adaptive filter blocks.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1B.

In some examples, the apparatus 150 may include the optional microphone system 170 shown in FIG. 1B. The optional microphone system 170 may include one or more microphones. According to some examples, the optional microphone system 170 may include an array of microphones. In some examples, the array of microphones may be configured to determine direction of arrival (DOA) and/or time of arrival (TOA) information, e.g., according to instructions from the control system 160. The array of microphones may, in some instances, be configured for receive-side beamforming, e.g., according to instructions from the control system 160. In some implementations, one or more of the microphones may be part of, or associated with, another device, such as a speaker of the speaker system, a smart audio device, etc. In some examples, the apparatus 150 may not include a microphone system 170. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 175 shown in FIG. 1B. The optional loudspeaker system 175 may include one or more loudspeakers, which also may be referred to herein as "speakers" or, more generally, as "audio reproduction transducers." In some examples (e.g., cloud-based implementations), the apparatus 150 may not include a loudspeaker system 175.

In some implementations, the apparatus 150 may include the optional sensor system 180 shown in FIG. 1B. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may be a single purpose audio device or a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1B. The optional display system 185 may include one or more displays, such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device, such as a smart speaker. In some such implementations the apparatus 150 may be, or may include, a wakeword detector. For example, the apparatus 150 may be configured to implement (at least in part) a virtual assistant.

Figure 2:
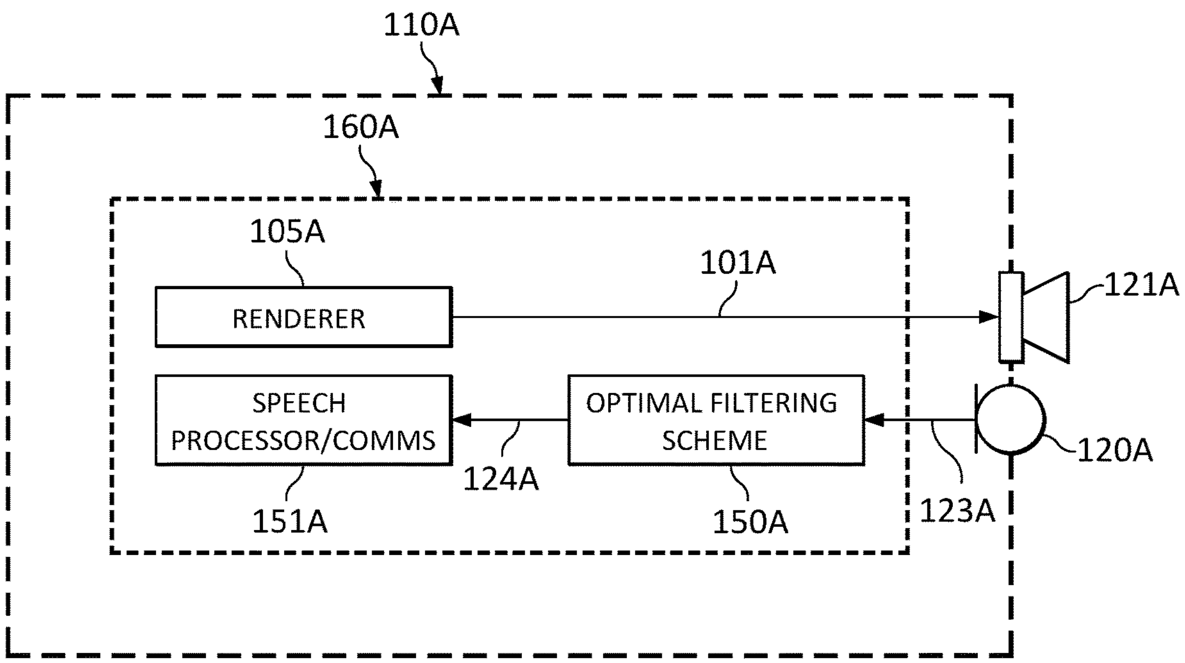
FIG. 2 is a block diagram that represents components of an audio device according to one example.

FIG. 2 is a block diagram that represents components of an audio device according to one example. In FIG. 2, the audio device 110A includes a loudspeaker 121A and a microphone 120A. In some examples, the loudspeaker 121A may be one of a plurality of loudspeakers in a loudspeaker system, such as the loudspeaker system 175 of FIG. 1B. Similarly, according to some implementations the microphone 120A may be one of a plurality of microphones in a microphone system, such as the microphone system 170 of FIG. 1B.

In this example, the audio device 110A includes a renderer 110A, a filter optimizing module 150A and a speech processor/communications block 151A. According to this example, the renderer 110A, the filter optimizing module 150A and the speech processor/communications block 151A are all implemented by the control system 160A, which is an instance of the control system 160 of FIG. 1B.

According to this example, the renderer 110A is configured to render audio data received by the audio device 110A or stored on the audio device 110A for reproduction on loudspeaker 121A. In this example, the renderer output 101A is provided to the loudspeaker 121A for playback.

In some implementations, the speech processor/communications block 151A may be configured for speech recognition functionality. In some examples, the speech processor/communications block 151A may be configured to provide telecommunications services, such as telephone calls, video conferencing, etc. Although not shown in FIG. 2, the speech processor/communications block 151A may be configured for communication with one or more networks, the loudspeaker 121A and/or the microphone 120A, e.g., via an interface system. The one or more networks may, for example, include a local Wi-Fi network, one or more types of telephone networks, etc.

In this example, the filter optimizing module 150A is configured to select and implement filters for enhancing the microphone signal(s) 123A, to produce the enhanced microphone signal(s) 124A. In some examples, the filter optimizing module 150A may be configured to perform acoustic echo cancellation (AEC), beam steering, active noise cancellation (ANC), dereverberation, or combinations thereof.

Acoustic echo cancellers (AECs) are often implemented in the subband domain for both performance and cost reasons. A subband domain AEC (which also may be referred to herein as a multi-channel AEC or an MC-AEC) normally includes a subband AEC for each of a plurality of subbands. Furthermore, also for practical reasons, each subband AEC normally runs multiple adaptive filters, each of which is optimal in different acoustic conditions. The multiple adaptive filters are controlled by adaptive filter management modules, so that overall the subband AEC may have the best characteristics of each filter.

Figure 3:
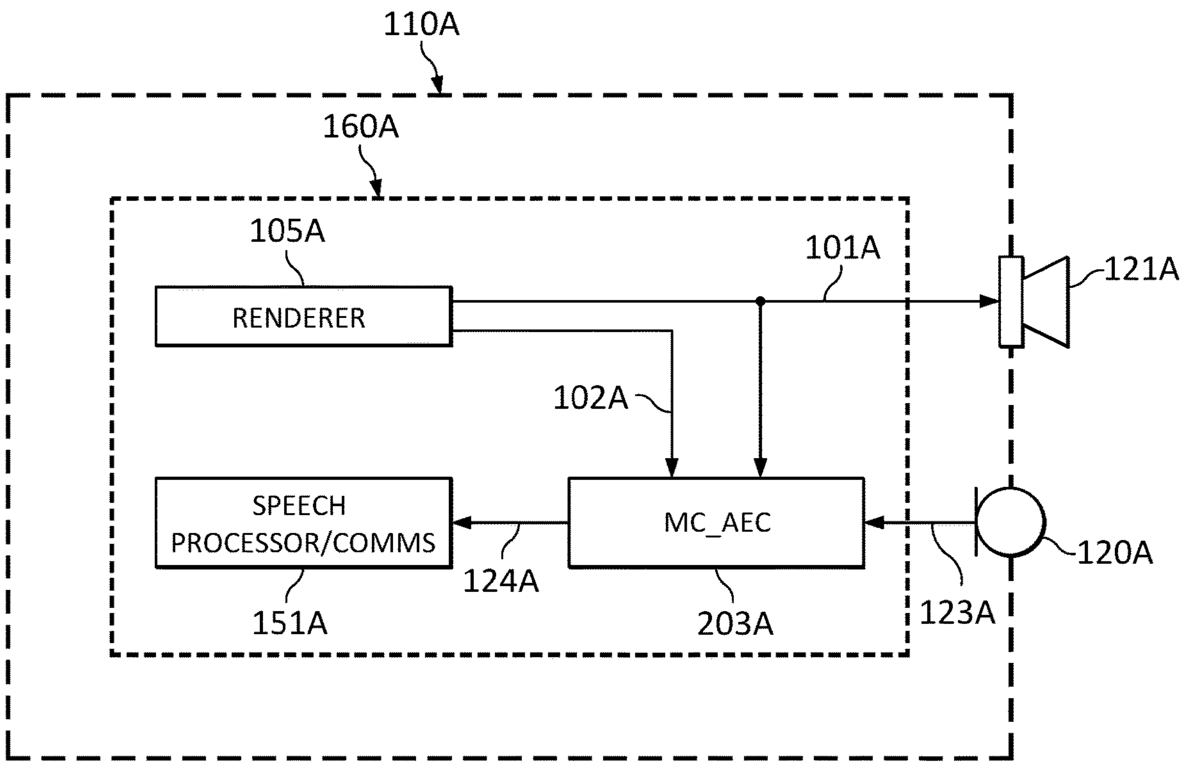
FIG. 3 is a block diagram that represents components of an audio device according to another example.

FIG. 3 is a block diagram that represents components of an audio device according to another example. In FIG. 3, the audio device 110A includes a loudspeaker 121A (may be one of a plurality of loudspeakers in a loudspeaker system) and a microphone 120A (which may be one of a plurality of microphones in a microphone system). In this example, the audio device 110A includes a renderer 110A, an MC-AEC 203A and a speech processor/communications block 151A. According to this example, the renderer 110A, the MC-AEC 203A and the speech processor/communications block 151A are all implemented by the control system 160A, which is an instance of the control system 160 of FIG. 1B.

The renderer 110A and the speech processor/communications block 151A may be configured substantially as described with reference to FIG. 2. However, in the example shown in FIG. 3 the renderer output 101A is also provided to the MC-AEC 203A as a reference for echo cancellation. Moreover, in the example shown in FIG. 3, the renderer 110A also provides the audio content 102A that is being played back the other audio devices in the audio environment. In the example shown in FIG. 1A, those audio devices would be audio devices 110B, 110C and 110D.

In this example, the MC-AEC 203A is an implementation of the filter optimizing module 150A that is described elsewhere herein, e.g., with reference to FIG. 2. According to this example, the MC-AEC 203A includes a subband AEC for each of a plurality of subbands. In this example, the MC-AEC 203A processes the microphone signals 123A and enhanced microphone signal(s) 124A include an echo-canceled residual signal (which also may be referred to herein as "residual output") to the speech processor/communications block 151A. In this example, the MC-AEC 203A is configured to select and implement filters for producing the echo-canceled residual signal. Some examples of such filters are described herein.

Figure 4:
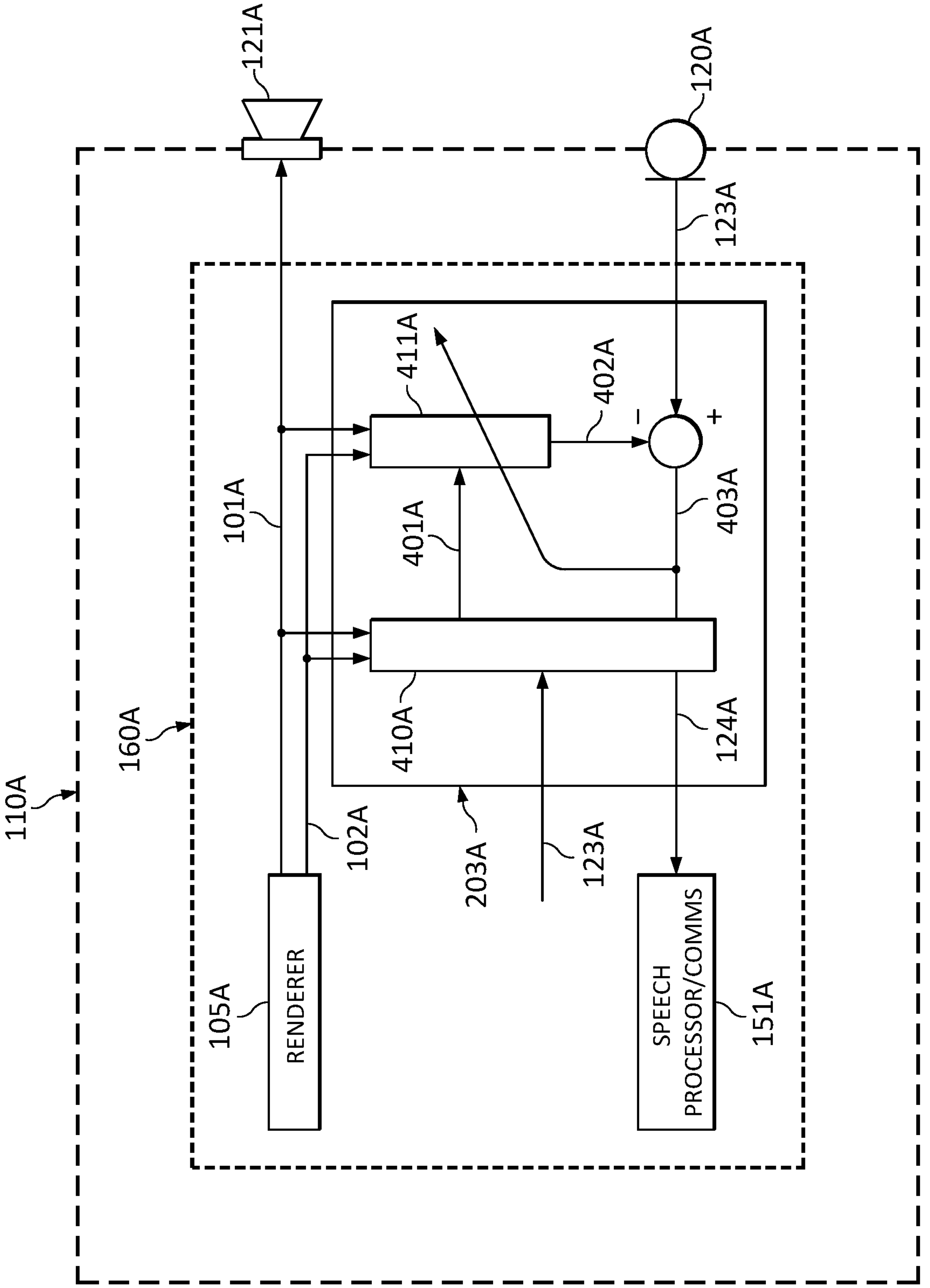
FIG. 4 is a block diagram that illustrates components of an audio device that includes the subband multi-channel acoustic echo canceller (MC-AEC) of FIG. 3 according to one example.

FIG. 4 is a block diagram that illustrates components of an audio device that includes the subband multi-channel acoustic echo canceller (MC-AEC) of FIG. 3 according to one example. The renderer 110A and the speech processor/communications block 151A may function substantially as described elsewhere herein, e.g., as described with reference to FIG. 3. In this example, the MC-AEC 203A includes a multi-channel, multi-hypothesis adaptive filter block (MC-MH AFB) 411A and a heuristic block 410A. In this example, the MC-MH AFB 411A is controlled by the heuristic block 410A by way of a plurality of control signals 401A. In a simple AEC, there may be an adaptive filter for each echo reference. If there are multiple echo references, the adaptive filters, in combination, produce a single echo signal. This is one example of a "filter set." The multi-hypothesis characteristic of the MC-MH AFB 411A refers to the fact that the MC-MH AFB 411A is producing a set of predicted echo reference signals 402A using a plurality of (multiple) adaptive filter sets. Each adaptive filter set of the plurality of adaptive filter sets may adapt differently and therefore may produce different predicted echo signals, each of which may be considered to be a hypothesis. According to some implementations, the hypotheses of the of the MC-MH AFB 411A are made diverse through varying adaptation algorithms. Some such adaptation algorithms are described in U.S. Provisional Patent Application No. 63/200,590, filed on Mar. 16, 2021 and entitled, "SUBBAND DOMAIN ACOUSTIC ECHO CANCELLER BASED ACOUSTIC STATE ESTIMATOR," particularly FIGS. 2 through 7E and the corresponding description, all of which is hereby incorporated by reference.

In some examples, the choice of these adaptation laws and heuristics 410A may be made by a person (such as a designer) such that out of all the hypotheses of the MC-MH AFB 411A there will be at least one good hypothesis in both favorable conditions and unfavorable conditions. That is, there will be at least one predicted echo signal in the set of predicted echo reference signals 402A that produces a good residual signal (one of the 403A signals) that is then in turn output by the heuristic block 410A as the enhanced microphone signal 124A. An example of a "good" residual signal is a lowest-power residual signal. Other examples of "good" residual signals may be produced by minimizing a cost of one of the cost functions disclosed herein. In some examples, the quality of a residual signal may be estimated according to how much of the echo remains in the residual signal, for example by correlating the residual signal with the echo references. Alternatively, or additionally, the quality of a residual signal may be estimated according to the stability of the residual signal over a time interval. An example of a time interval corresponding to an "unfavorable condition" is a time interval during a disturbance (e.g., during an acoustical change in the audio environment, such as an acoustical change caused by a noise source), after a disturbance, or both during and after a disturbance.

Although not illustrated as such in FIG. 4 for the sakes of simplicity and convenience, the MC-AEC 203A may include a plurality of subband AECs, one for each of a plurality of subbands. In some such examples, each of the subband AECs may be configured to receive subband domain microphone signals from an analysis filter bank and may be configured to output one or more subband domain residual signals 304*i* to a synthesis filter bank. According to some such examples, each of the subband AECs may include subband-based instances of the heuristic block 410A and the MC-MH AFB 411A.

According to some examples, each type of adaptive filter of the MC-MH AFB 411A may perform better in different acoustic conditions. For example, one type of adaptive filter may be better at tracking echo path changes whereas another type of adaptive filter may be better at avoiding misadaptation during instances of doubletalk. The adaptive filters of the MC-MH AFB 411A may, in some examples, include a continuum of adaptive filters. The adaptive filters of the MC-MH AFB 411A may, for example, range from a highly adaptive or aggressive adaptive filter (which may sometimes be referred to as a "main" adaptive filter) that determines filter coefficients responsive to current audio conditions (e.g., responsive to a current error signal) to a highly conservative adaptive filter (which may sometimes be referred to as a "shadow" adaptive filter) that provides little or no change in filter coefficients responsive to current audio conditions.

In some implementations, the adaptive filters of the MC-MH AFB 411A may include adaptive filters having a variety of adaptation rates, filter lengths and/or adaptation algorithms (e.g., adaptation algorithms that include one or more of least mean square (LMS), normalized least mean square (NLMS), proportionate normalized least mean square (PNLMS) and/or recursive least square (RLS)), etc. In some implementations, the adaptive filters of the MC-MH AFB 411A may include linear and/or non-linear adaptive filters, adaptive filters having different reference and microphone signal time alignments, etc. According to some implementations, the adaptive filters of the MC-MH AFB 411A may include an adaptive filter that only adapts when the output is very loud or very quiet. For example, a "party" adaptive filter might only adapt to the loud parts of output audio.

According to this example, the heuristic block 410A is configured to select a subband domain residual signal from the plurality of residual signals 403 according to a set of heuristic rules. For example, the heuristic block 410A may be configured to monitor the state of the system and to manage the MC-MH AFB 411A through mechanisms such as copying filter coefficients from one adaptive filter into the other if certain conditions are met (e.g., one is outperforming the other). For example, if adaptive filter A is clearly outperforming adaptive filter B, the subband domain adaptive filter management module 411 may be configured to copy the filter coefficients for adaptive filter A to adaptive filter B. In some instances, the subband domain adaptive filter management module 411 may also issue reset commands to one or more adaptive filters of the plurality of subband domain adaptive filters 410 if the subband domain adaptive filter management module 411 detects divergence.

Figure 5:
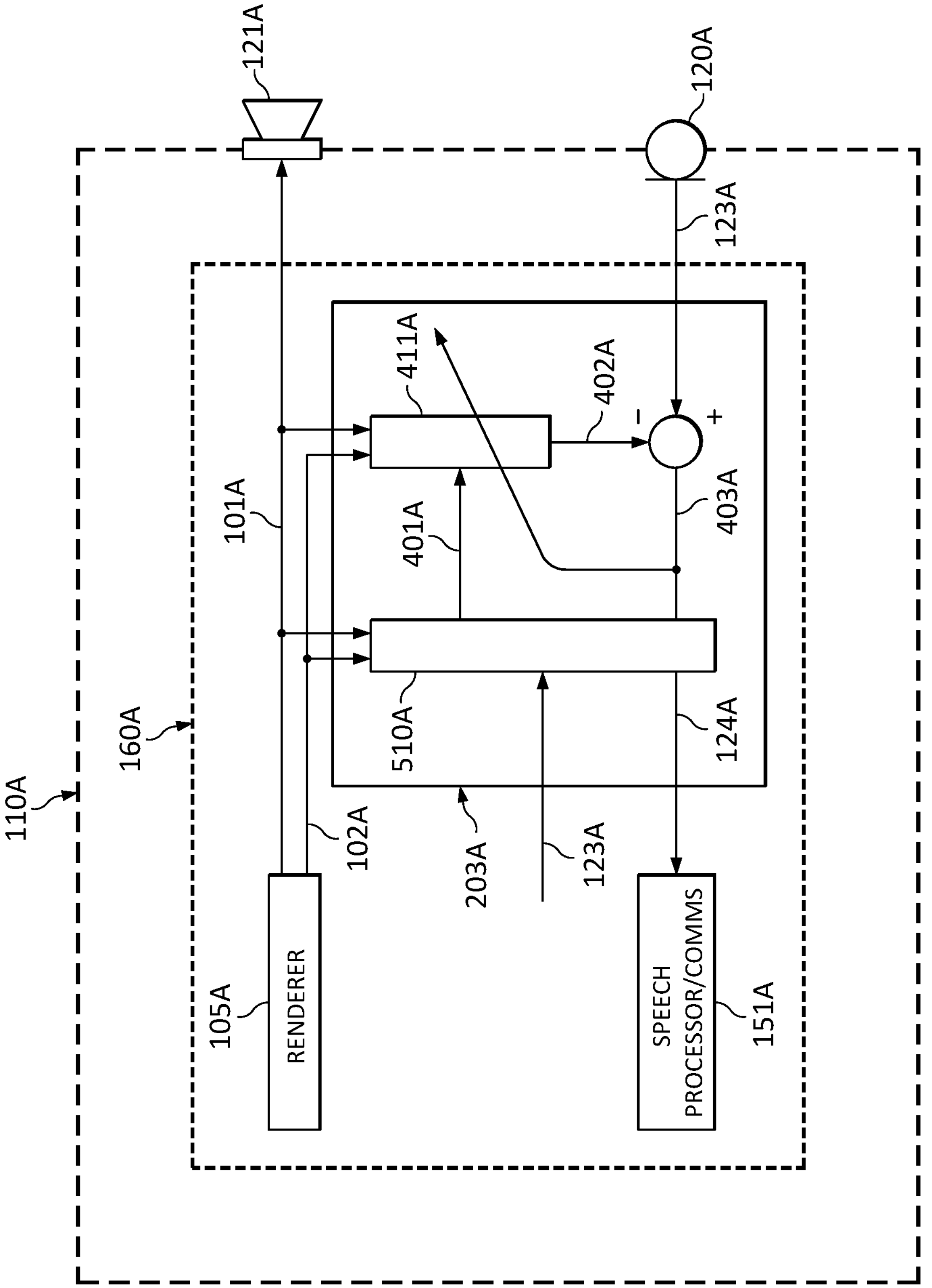
FIG. 5 is a block diagram that illustrates components of an alternative example an audio device.

FIG. 5 is a block diagram that illustrates components of an alternative example an audio device. In this example, the audio device 110A includes a renderer 110A and a speech processor/communications block 151A, both of which may function substantially as described elsewhere herein. According to this example, the audio device 110A includes an alternative implementation of the MC-AEC 203A of FIG. 4. Here, the MC-AEC 203A includes an MC-MH AFB 411A, which may function substantially as described above with reference to FIG. 4. However, in this example a neural network block 510A replaces the heuristic block 410A shown in FIG. 4. According to this example, instead of simply implementing pre-set heuristics, the neural network block 510A is configured both to learn and to implement heuristics for controlling the MC-MH AFB 411A. The neural network block 510A may implement one or more of various neural networks, which may include any neural network that is configured to consider feedback based on previous states.

Accordingly, the neural network block 510A is configured to control the MC-MH AFB 411A in this example. Various types of control mechanisms may be implemented, depending on the particular implementation. Such control mechanisms may include:

One or more mechanisms or implemented rules for controlling the adaptation step size, which corresponds to the rate at which the adaptive filters in the MC-MH AFB 411A are changing;

Adaptation halting. This is equivalent to setting the adaptation step size to zero. Adaptation may be halted for any time interval deemed appropriate by the neural network block 510A. If the neural network block 510A has learned that a particular adaptive filter provides consistently poor results and/or that the particular adaptive filter is not useful, the neural network block 510A may permanently cease adaptation according to that particular adaptive filter;

Adaptive filter coefficient resetting; and/or.

Copying the filter coefficients of one type of adaptive filter to those of another type of adaptive filter. For example, if adaptive filter type A is producing superior results compared to those of adaptive filter type B, the filter coefficients for adaptive filter type A may be copied into the adaptive filters of adaptive filter type B.

The neural network block 510A may be trained via offline training (e.g., prior to deployment by an end user), online training (e.g., during deployment by an end user) or by a combination of both offline training and online training. Various examples of training the neural network block 510A are disclosed herein. One or more cost functions used to optimize the neural network block 510A may be chosen by a person, such as a system designer. The cost function(s) may be chosen in such a way as to attempt to make the set of hypotheses corresponding to the plurality of sets of adaptive filters of the MC-MH AFB 411A be globally optimal. The definition of globally optimal is application dependent and chosen by the designer. In some examples, the cost function(s) may be selected to optimize for one or more of the following:

Minimizing the power of the residual signal across a plurality of hypotheses;

Minimizing the power of the adaptive filters (regularization);

Minimizing the corruption of any desired signal (such as speech) to be enhanced in a microphone feed;

Maximizing the uniqueness of the hypotheses in of the MC-MH AFB 411A;

Maximizing robustness during or after periods of acoustic disturbances; or.

Any combination of the above.

Additional detailed examples of training the neural network block 510A are described below.

Figure 6:
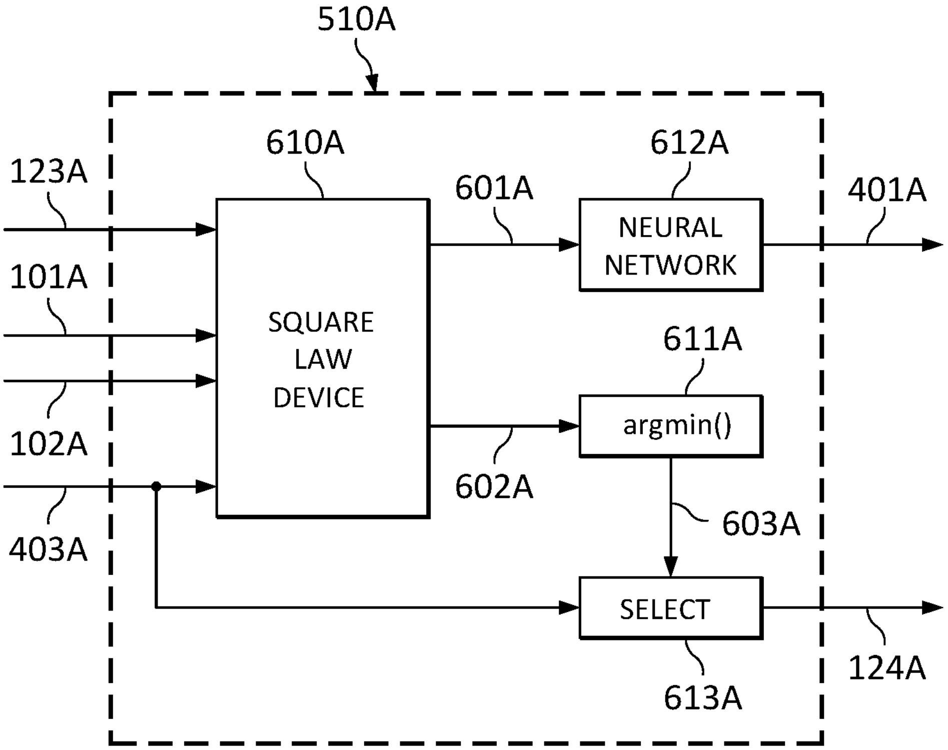
FIG. 6 is a block diagram that shows examples of components of the neural network block of FIG. 5.

FIG. 6 is a block diagram that shows examples of components of the neural network block of FIG. 5. In this example, the elements of FIG. 6 are as follows:

101A: The audio content played by the audio device 110A;

102A: the audio content played by other audio devices in the audio environment. In the example shown in FIG. 1A, these audio devices would include audio devices 110B, 110C and 110D;

123A: A plurality of microphone signals;

401A: a plurality of signals to control and aid the adaptive filters of the MC-MH AFB 411A;

403A: a plurality of residual signals;

601A: a plurality of microphone power signals, content power signals, and residual power signals, multiplexed together;

602A: a plurality of residual power signals;

610A: a square law block;

611A: a block configured to output the argument (index) of the input, which are minima;

603A: the argument (index) of the minima;

613A: a selection block configured to select one of the inputs based on an index;

124A: a plurality (one for each microphone) of residual signals; and

612A: a trained Deep Neural Network.

In this embodiment, the square law device 601A is configured to compute the square of all input signals and to output corresponding power signals. The argmin block 611A is configured to determine which of the residual power signals 602A (the argument) has the lowest power and outputs the argument 603A to the selection block 613A. The selection block 613A is configured to select one of the residual signals 403A corresponding to the argument 603A, and to provide a selected residual signal as one of the output residual signals 124A. In this example, the neural network block 612A is configured to consume the power signals 601A and to determine the control signals 401A for controlling the adaptive filters of the MC-MH AFB 411A.

Figure 7:
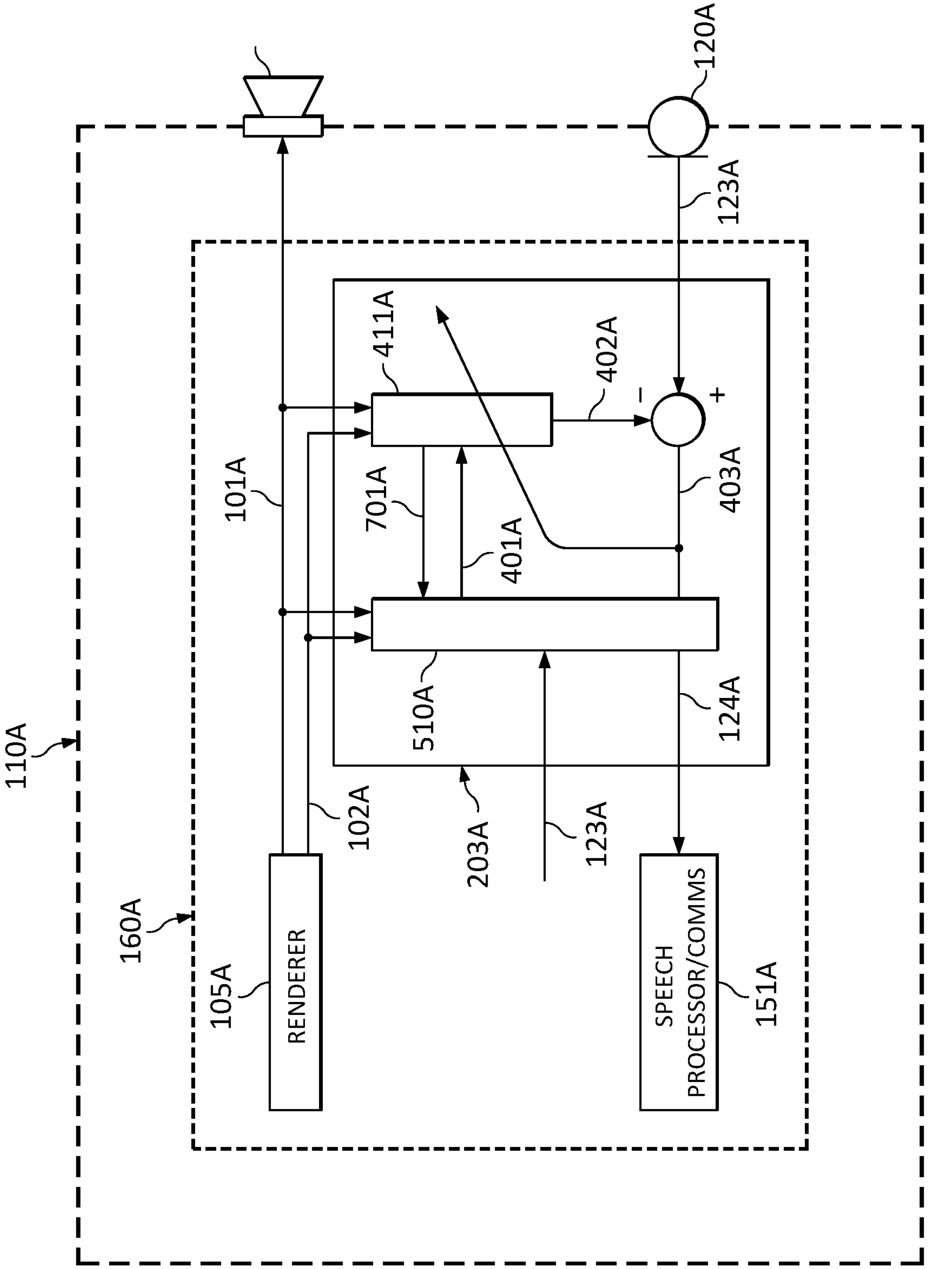
FIG. 7 is a block diagram that illustrates components of an alternative implementation of an audio device.

FIG. 7 is a block diagram that illustrates components of an alternative implementation of an audio device. In this example, the audio device 110A includes a renderer 110A and a speech processor/communications block 151A, both of which may function substantially as described elsewhere herein. According to this example, the audio device 110A includes an alternative implementation of the MC-AEC 203A, which is another example of the filter optimizing module 150A that is described elsewhere herein.

In this example, the filter coefficients 701A of the adaptive filters of the MC-MH AFB 411A are being fed back into the neural network block 510A as input. According to this example, the control signals 401A are based, at least in part, on the filter coefficients 701A. FIG. 7 illustrates one example that may be configured for implementing a regularization cost function that is based on minimizing the power of the adaptive filters. The neural network block 510A may implement such a cost function based on the filter coefficients 701A. According to some examples, the coefficients 701A of the adaptive filters of the MC-MH AFB 411A may be fed back into the neural network block 510A during both neural network training and run-time operations.

Figure 8:
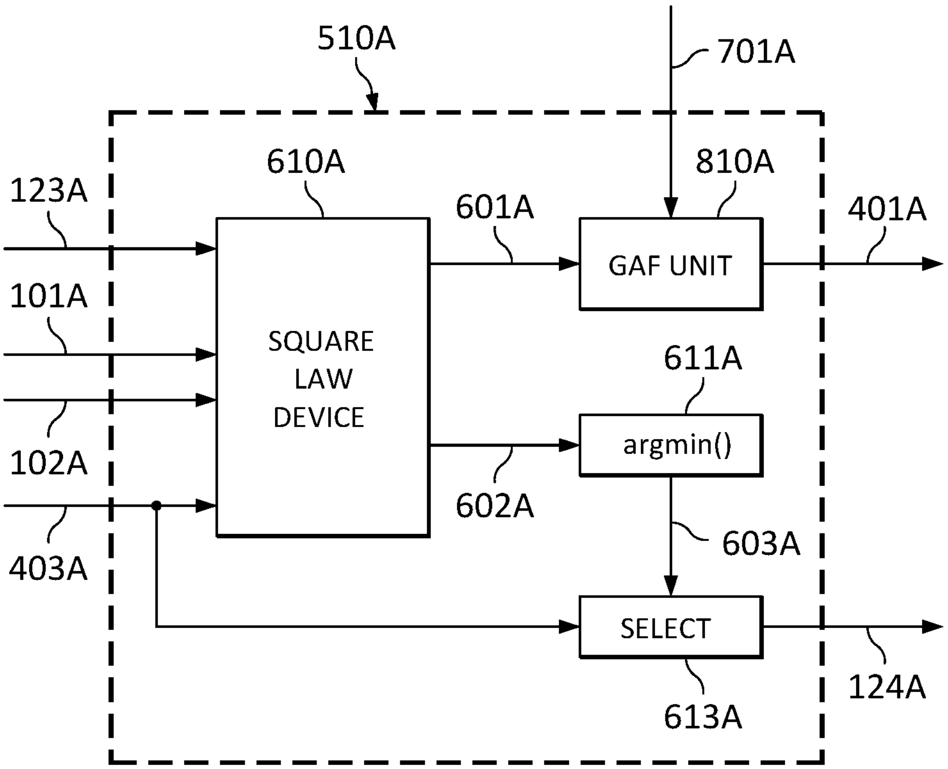
FIG. 8 is a block diagram that shows an alternative example of the neural network blocks of FIGS. 5 and 6.

FIG. 8 is a block diagram that shows an alternative example of the neural network blocks of FIGS. 5 and 6. In this example, as in FIG. 7, the filter coefficients 701A of the adaptive filters of the MC-MH AFB 411A are being fed back into the neural network block 510A as input. According to this example, the elements of FIG. 8 are as follows:

101A: The audio content played by the audio device 110A;

102A: the audio content played by other audio devices in the audio environment. In the example shown in FIG. 1A, these audio devices would include audio devices 110B, 110C and 110D;

123A: A plurality of microphone signals;

124A: A plurality of enhanced microphone signals;

401A: a plurality of signals to control and aid the adaptive filters of the MC-MH AFB 411A;

403A: a plurality of residual signals;

601A: a plurality of microphone power signals, content power signals, and residual power signals, multiplexed together;

602A: a plurality of residual power signals;

610A: a square law block;

611A: a block configured to output the argument (index) of the input, which are minima;

603A: the argument (index) of the minima;

613A: a block configured to select one of the inputs based on an index;

701A: coefficients of the adaptive filters of the MC-MH AFB 411A; and

810A: another implementation of a trained Deep Neural Network, which is a gated adaptive filter (GAF) unit in this example.

In this embodiment, the square law device 601A is configured to compute the square of all input signals and to output corresponding power signals. The argmin block 611A is configured to determine which of the residual power signals 602A (the argument) has the lowest power and to output the argument 603A to the selection block 613A. The selection block 613A is configured to select one of the residual signals 403A corresponding to the argument 603A, and to provide a selected residual signal as one of the output residual signals 124A.

In this example, the GAF unit 810A is configured to determine the control signals 401A for controlling the adaptive filters of the MC-MH AFB 411A based, at least in part, on the power signals 601A and the filter coefficients 701A. In this example, the GAF unit 810A has been trained to produce the control signals 401A for controlling adaptive filters of the MC-MH AFB 411A based, at least in part, on the filter coefficients 701A.

Figure 9:
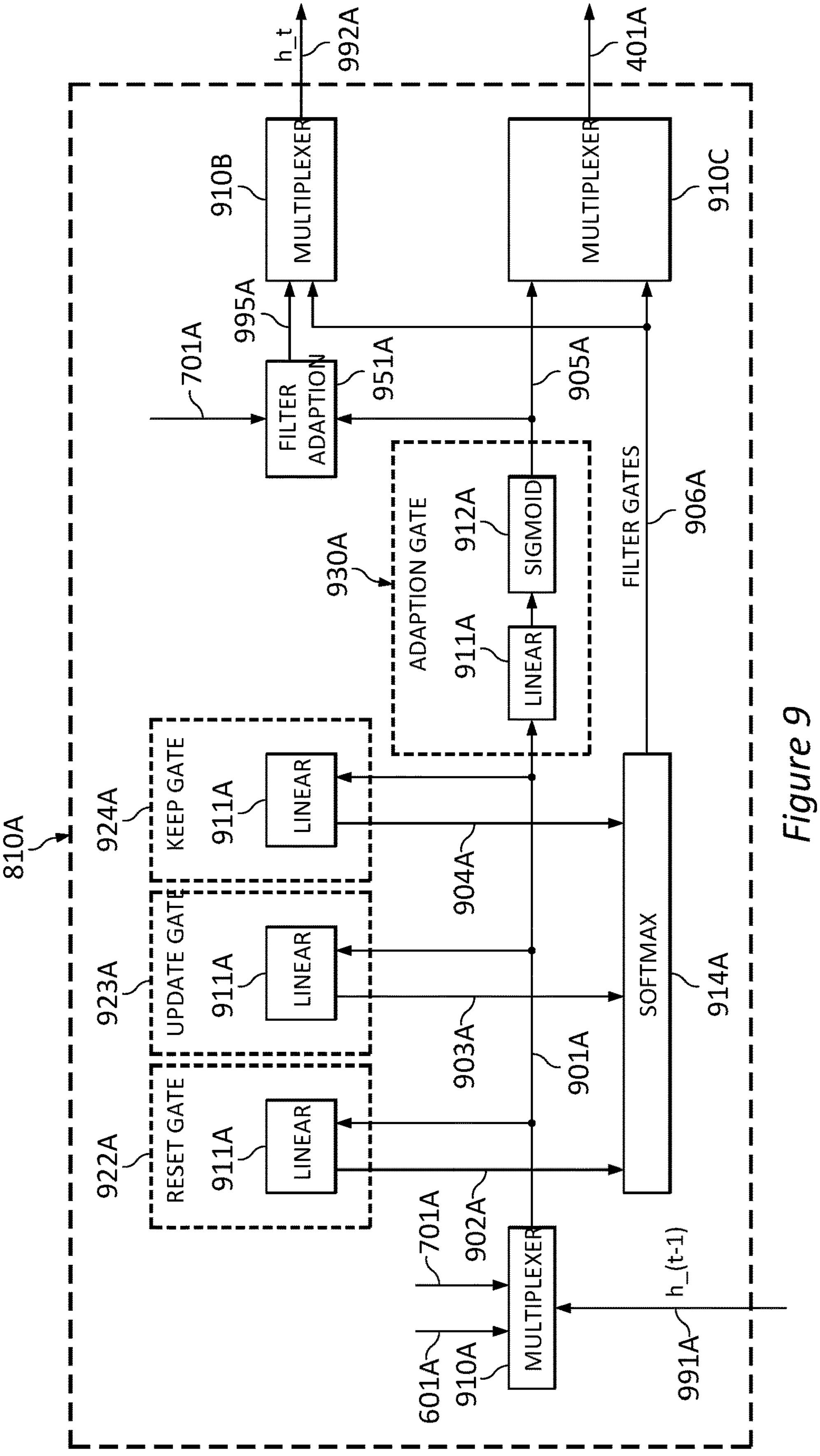
FIG. 9 is a block diagram that shows example components of the gated adaptive filter (GAF) unit of FIG. 8.

FIG. 9 is a block diagram that shows example components of the gated adaptive filter (GAF) unit of FIG. 8. In this example, as in FIGS. 7 and 8, the filter coefficients 701A of the adaptive filters of the MC-MH AFB 411A are being fed back into the neural network block 510A (here, the GAF unit 810A) as input. In this example, the GAF unit 810A includes a multiplexer 910A, which receives and multiplexes the hidden state information 991A, the filter coefficients 701A, the multiplexed microphone power signals, content power signals, and residual power signals 601A, and outputs the multiplexed signals 901A. In this example, the hidden state information 991A has been produced by the GAF unit 810A during a previous time step. Here, the hidden state information 992A is being produced by the GAF unit 810A during the current time step.

According to this example, the GAF unit 810A also includes a reset gate 922A, an update gate 923A, a keep gate 924A and an adaptation gate 930A, which generate reset signals 902A, update signals 903A, keep signals 904A and adaptation signals 905A, respectively. In this example, the reset signals 902A, update signals 903A and keep signals 904A correspond to indications that filter coefficients of adaptive filters should be reset, updated or kept unchanged, respectively. In some examples, the reset signals 902A may correspond to indications of divergence, e.g., that the output of adaptive filters has diverged too far and cannot be recovered. According to some examples, the update signals 903A may correspond to indications that the filter coefficients of a better-performing adaptive filter should be copied to those of a worse-performing adaptive filter. For example, if adaptive filter A is clearly outperforming adaptive filter B, the update signals 903A may indicate that the filter coefficients for adaptive filter A should be copied to adaptive filter B.

In this example, a reset signal 902A, an update signal 903A and a keep signal 904A are provided by the reset gate 922A, the update gate 923A and the keep gate 924A, respectively, to a signal selection module 914A, which is configured to select a one of the input signals (the reset signal 902A, the update signal 903A or the keep signal 904A) and to output selected filter signals 906A. In this example, the signal selection module 914A is implemented via a softmax module. In other examples, the signal selection module 914A may be implemented by implementing an argmax function or a "soft margin" softmax function. In this example, the signal selection module 914A is configured to apply the following softmax function to the reset signal 902A, the update signal 903A and the keep signal 904A:

$$\sigma(z)_i = \frac{e^{z_i}}{\sum_{j=1}^{K} e^{z_j}}$$

In the foregoing softmax function, the input vector z may be expressed as follows:

$$z = [r, u, k] = [z_1, z_2, z_3]$$

In the foregoing equation, r represents the reset signal 902A, u represents the update signal 903A and k represents the keep signal 904A. In the softmax function, "i" corresponds to a particular value of r, u or k. So, one example of the softmax function in which i=1 would be $z_1/(z_1+z_2+z_3)$. This makes the output of the signal selection module 914A bounded by zero and 1. The vector at time t may be expressed as follows:

$$z_t = [r_t, u_t, k_t] = [z_{t,1}, z_{t,2}, z_{t,3}]$$

In some examples, the reset gate 922A may compute the reset signal 902A ($r_t$) using a linear layer 911A, e.g., as follows:

$$r_t = (W_r x_t + U_r h_{t-1} + b_r)$$

In the foregoing equation, $W_r$ and $U_r$ represent the weights of the reset layer and $b_r$ represents the bias of the reset layer. W, U and b may be learned as part of a process of training the GAF unit 810A. In some examples, W, U and b may be any number and are not bounded by zero and 1.

Similarly, update gate 923A may compute the update gate signal 903A using a linear layer 911A, e.g., as follows:

$$u_t = (W_u x_t + U_u h_{t-1} + b_u)$$

In the foregoing equation, $W_u$ and $U_u$ represent the weights of the update layer and by represents the bias of the update layer.

In some examples, the keep gate 924A may compute the keep gate signal 904A using a linear layer 911A, e.g., as follows:

$$k_t = (W_k x_t + U_k h_{t-1} + b_k)$$

In the foregoing equation, $W_k$ and $U_k$ represent the weights of the keep layer and $b_k$ represents the bias of the keep layer.

The inputs to the foregoing equations for $r_t$, $u_t$ and $k_t$ is denoted as $x_t$, which represents the filter coefficients 701A and a plurality of microphone power signals, audio content power signals and residual power signals (601A) multiplexed together. Accordingly, $x_t$ represents essentially everything in the multiplexed signals 901A output by the multiplexer 910A, except for the hidden state information 991A.

According to this example, the adaptation gate 930A is configured to output an adaptation gate signal that is computed, at least in part, by the linear layer 911A. In this example, the adaptation gate 930A includes a sigmoid function block 912A that is configured to produce an output adaptation gate signal 905A that is in the range from 0 to 1, e.g., as follows:

$$\alpha_t = S(W_a x_t + U_\alpha h_{t-1} + b_\alpha)$$

In the foregoing equation, at represents the output adaptation gate signal 905A and S represents a sigmoid function, which may be expressed as follows:

$$S(x) = \frac{1}{1 + e^{-x}}$$

In this example, the multiplexer 910C generates the control signals 401A by multiplexing the output adaptation gate signal 905A and the selected filter signals 906A output by the signal selection module 914A.

According to this example, the GAF unit 810A includes an optional filter adaptation module 951A, which is configured to compute the filter adaptation step 995A based on the output adaptation gate signal 905A and the filter coefficients 701A. In some such examples, the filter adaptation step 995A may be represented as $\alpha_t\ \delta W_t$, where $\delta W_t$ indicates how much the filter coefficients 701A have changed and $\alpha_t$ represents the output adaptation gate signal 905A. In some examples, $\delta W_t$ may be computed using the adaptation algorithm for each of the multiple hypotheses (corresponding to sets of adaptive filters) of the MC-MH AFB 411A. Such adaptation algorithm algorithms may include normalised least-mean-squares (NLMS) and proportionate NLMS (PNLMS) algorithms, which can provide diversity in the hypotheses. However, in some examples the adaption algorithms may not be specified. It may not be necessary to specify the adaption algorithms so long as the neural network (in this example, the GAF unit 810A) is able to learn to produce diverse hypotheses by way of controlling each of the filters differently.

In some alternative implementations, the GAF unit 810A may not include a filter adaptation module 951A. In some such implementations, the GAF unit 810A may be configured to obtain the filter adaptation step 995A from the MC-MH AFB 411A.

According to this example, the multiplexer 910B is configured to determine the hidden state information 992A, which is being produced by the GAF unit 810A during the current time step, by concatenating the filter adaptation step 995A and the selected filter signals 906A output by the signal selection module 914A, e.g., as follows:

$$h_t = [f_t, \alpha_t \delta W_t]$$

In the foregoing equation, $f_t$ represents the selected filter signals 906A and $\alpha_t\ \delta W_t$ represents the filter adaptation step 995A.

Training Examples

Examples of Training Data

In some examples, the data used for training contains "clean" echo, which is microphone data including only "echo" corresponding to audio played back by one or more audio devices in an audio environment, in addition to other training vectors which contain both echo and perturbations. The nature of the perturbations included in the training dataset will define the behaviour of the learned heuristics and will thus define the performance of a system that includes the trained neural network when the device or system is deployed into the real world. In some such examples, the data used for training may contain:

- "Clean" echo, e.g., vectors where only echo is present in the microphone feed; and
- Perturbed data, which may include:
  - Stationary room noise;
  - Non-stationary room noise;
  - Echo path changes;
  - Non-stationary speech; or
  - Any combination of the above.

Examples of Cost Functions Suitable for Training

This section provides examples of cost functions in the context of training neural networks for functionality relating to MC-AECs. One of ordinary skill in the art will appreciate that at least some of the disclosed examples will apply to training neural networks for other types of functionality.

The goal of many MC-AECs is to reduce the power of the residual signal. Thus, one cost function that one could consider for training a neural network for implementing an MC-AEC would be a cost function that seeks to reduce the mean-square of the residual signal over all N of the hypotheses in an adaptive filter bank, such as an adaptive filter bank of the MC-MH AFB 411A. One such cost function may be expressed as follows:

$$C = \sum_{n=1}^{N} (res_n)^2$$

In this example, $res_n$ represents the amplitude of the residual signal. A cost function of this type may be used to derive the instantaneous adaptation of many adaptive filters (e.g., those used to compute the adaptation step of the MC-MH AFB 411A.). In some examples, one may wish to reduce the power of the residual signal over the entire time T of the training vector, e.g., as follows:

$$C = \sum_{t=1}^{T} \sum_{n=1}^{N} (res_{n,t})^2$$

When non-stationary perturbations are in the training data, one may wish to weight the time periods surrounding these non-stationary perturbations more heavily. This may be due to the fact that perturbation timesteps are underrepresented in the data and/or because one realizes that one or more of the heuristics that one wishes the neural network to learn are non-stationary perturbations. In order to weight the time periods surrounding non-stationary perturbations more heavily, some examples involve altering any of the cost functions (above or below) which involve summing over T, e.g., as follows:

$$C = \sum_{t=1}^{T} \sum_{n=1}^{N} (\beta_t res_{n,t})^2$$

In the foregoing equation, $\beta_t$ represents a vector that weights each timestep. For example, one could set timesteps to be 0.1 second, in general, whereas timesteps during perturbations could be set to 0.5 seconds and those during a time interval immediately after the perturbations (e.g., for the next 2 seconds, the next 3 seconds, the next 4 seconds, etc.) to be 1.0. This would place emphasis on the heuristics that are being learned to provide robustness in the presence of perturbations (which may be a primary goal of the heuristics).

Alternatively, or additionally, one could consider that the target application would revolve around the MC-AEC (in this example) not only trying to completely cancel the echo, but also to improve the ability of a downstream automatic speech recognition (ASR) module to listen to the user in the room. Therefore, if we have a copy of the clean speech signal that is present in the training corpus (the audio data used for training), one could use a cost function such as the following:

$$C=\sum_{t=1}^{T}\sum_{n=1}^{N}(\text{speech}_t-res_{n,t})^2$$

In the foregoing equation, speech, represents the clean speech signal.

Alternatively, or additionally, a cost function may be based, at least in part, on any other type of intelligibility metric, on a mean opinion score (MOS), etc. Such cost functions would place an emphasis on the system enhancing a user's speech and distinguishing the user's speech from the corrupted (speech and echo) microphone signals.

In some examples, one may wish to train a neural network to replicate a hand-crafted set of heuristics, such as those produced by the heuristic block 410A of FIG. 4. In one such example, the cost function may be based on the mean-squared error between these two control signals (401A), e.g., as follows:

$$C=\sum_{t=1}^{T}(\theta_t^{MAN}-\theta_t^{NN})^2$$

In the foregoing equation, $\theta^{MAN}$ represents the control signals resulting from a hand-crafted set of heuristic rules and $\theta^{NN}$ the control signals produced by the neural network. If the nature of these signals is binary-like, a log-loss type cost function may be more suitable. The term "binary-like" implies that the signal only involves 2 numbers, or that the signal is continuous but only takes on 2 numbers effectively. For example, a signal x=[0, 1, 1, 0, 1, 0] is binary. The signal x=[0.1 0.89, 0.9, 0.08, 0.92, 0.05] is binary-like because it is essentially just taking on two values, plus a small amount of noise. The term "log-loss cost function" refers to a cross-entropy cost function. Therefore, a "log-loss type cost function" refers to other cost functions that are similar to the cross-entropy cost function, such as the Kullback-Leibler divergence cost function.

A typical issue with machine learning in general and machine learning for AECs specifically is that of overfitting. We can penalise overfitting by using a cost function such as the following for training a neural network:

$$C=\sum_{t=1}^{T}\sum_{n=1}^{N}(\zeta_{n,t})^2$$

In the foregoing equation, $\zeta$ represents the filter coefficients of an adaptive filter bank. This cost function resembles an L2 regularization and may not be useful on its own. However, see the discussion of combining cost functions below. A cost function of this type may be useful in mitigating the non-uniqueness problem that arises in the multi-channel AEC scenario due to correlated content.

Having multiple hypotheses in an adaptive filter bank can be useful in a non-static audio environment. By specifying $\beta_t$ such that the time immediately after a perturbation that contributed significantly to the total cost of the vector, the neural network may be able to reduce this cost by ensuring that the coefficients of each of the adaptive filters are significantly different at that time (for example, by ensuring one filter has paused adaptation during a perturbation and that another filter has not paused adaptation during the perturbation). However, in some examples this feature may not be explicitly a part of the cost function and therefore the desired behavior is not guaranteed to be learned. Thus, it can be useful to use a cost function that penalizes the similarity of any two hypotheses in an adaptive filter bank. Such a penalty may, for example, be based on a simple distance metric (such as a Euclidean distance metric, a Manhattan distance metric, a cosine distance metric, etc.) that may be temporally weighted with $\beta_t$.

Any number of the above-described cost functions can be combined together using, for example, Lagrange multipliers, to use the cost functions simultaneously. In some examples, the above-described cost functions may be used sequentially, for example in the context of transfer learning as described elsewhere herein.

Figure 10:
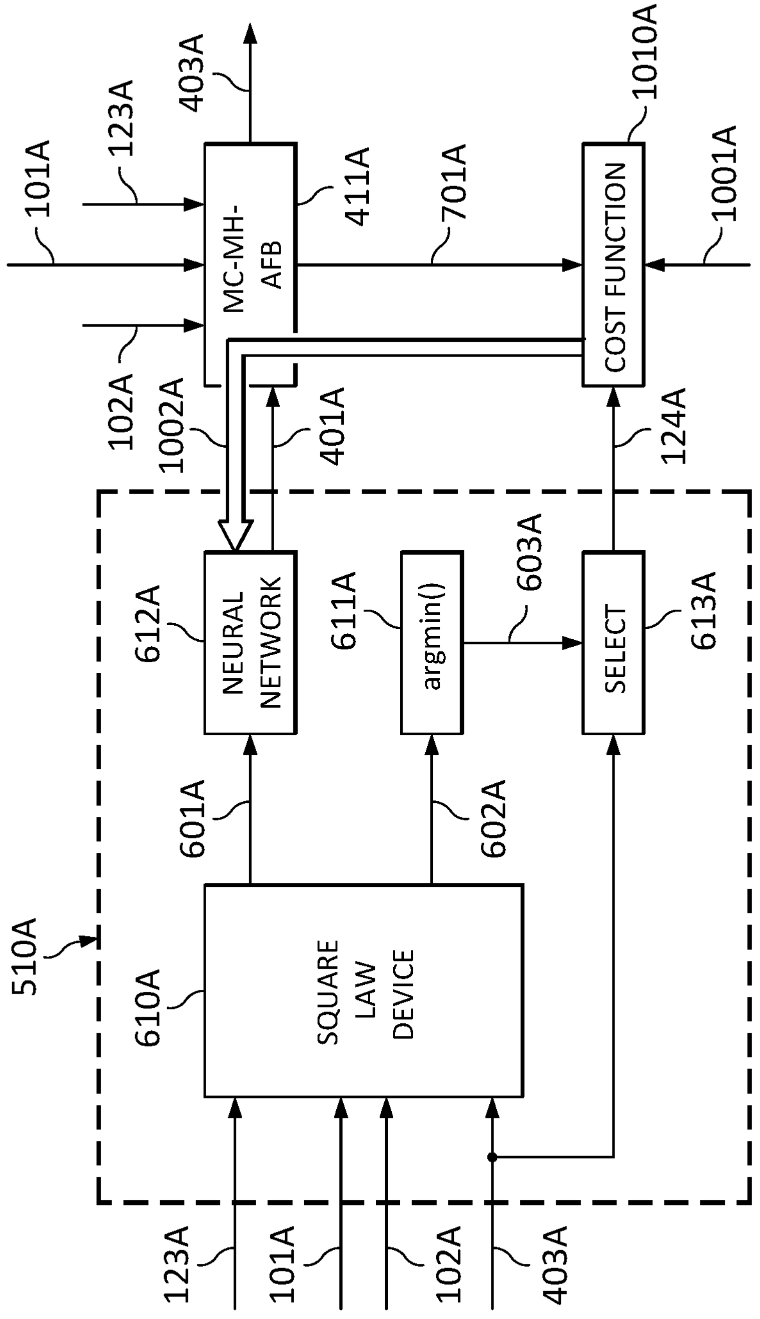
FIG. 10 is a block diagram that illustrates blocks that may be used for training a neural network according to one example.

FIG. 10 is a block diagram that illustrates blocks that may be used for training a neural network according to one example. In addition to the blocks that have been described above (primarily with reference to FIG. 6), the elements of FIG. 10 include the following:

- 1010A: A cost function block that is configured to compute a cost according to one or more cost functions (such as one or more of the cost functions described above);
- 1001A: auxiliary information used by the cost function block 1010A to compute the cost, such as a copy of clean speech signals (if the training data involves using corrupted speech signals) or a copy of hand-crafted heuristic control signals; and
- 1002A: A cost function gradient signal.

In this particular instance, the neural network being trained is the neural network block 612A of FIG. 6. However, this example is valid for most neural network configurations (including, but not limited to, the GAF unit 810A). In this example, the cost is computed in the cost function block 1010A and the gradient of the corresponding cost function is backpropagated through an adaptive filter bank of the MC-MH AFB 411A to the neural network block 612A. From there, standard backpropagation through the layers of the neural network block 612A may be used to compute the gradient for the coefficients within the neural network. These gradients may then be used to update the coefficients during training.

The training may involve providing a corpus of suitable training data and one or more suitable cost functions, such as one or more types of training data and cost functions disclosed herein. According to some examples, the training data and/or the cost functions may be selected for a target audio environment in which the system will be deployed, for example assuming perturbations and noise levels representative of a typical home acoustic environment.

It can be useful to train a neural network to first replicate hand-crafted heuristics which have proven to be at least somewhat useful in most environments, such as those disclosed in United States Provisional Patent Application No. 63/200,590, filed on Mar. 16, 2021 and entitled, "SUB- BAND DOMAIN ACOUSTIC ECHO CANCELLER BASED ACOUSTIC STATE ESTIMATOR," particularly FIGS. 2 through 7E and the corresponding description, all of which has been incorporated by reference. This training process may involve using a cost function based, at least in part, on the difference between the computed neural control signal and a control signal based on the hand-crafted heuristics. Some examples may involve a subsequent transfer learning process in which the neural network is retrained with one or more cost functions that are selected to further optimize performance given a target audio environment (such as a home environment, an office environment, etc.) and a target application (such as wakeword detection, automatic speech recognition, etc.). The transfer learning process may, for example, involve a combination of new training data (e.g., with noise and echo representative of a target device and/or a target audio environment) and a new cost function such as a cost function based on speech corruption.

In some examples, transfer learning may be performed after a device that includes a trained neural network has been deployed into the target environment and activated (a condition that also may be referred to as being "online"). Many of the cost functions defined above are suitable for unsupervised learning after deployment. Accordingly, some examples may involve updating the neural network coefficients online in order to optimize performance. Such methods may be particularly useful when the target audio environment is significantly different from the audio environment(s) which produced the training data, because the new "real world" data may include data previously unseen by the neural network.

In some examples, the online training may involve supervised training. In some such examples, automatic speech recognition modules may be used to produce labels for user speech segments. Such labels may be used as the "ground truth" for online supervised training. Some such examples may involve using a time-weighted residual in which the weight immediately after speech is higher than the weight during speech.

Figure 11:
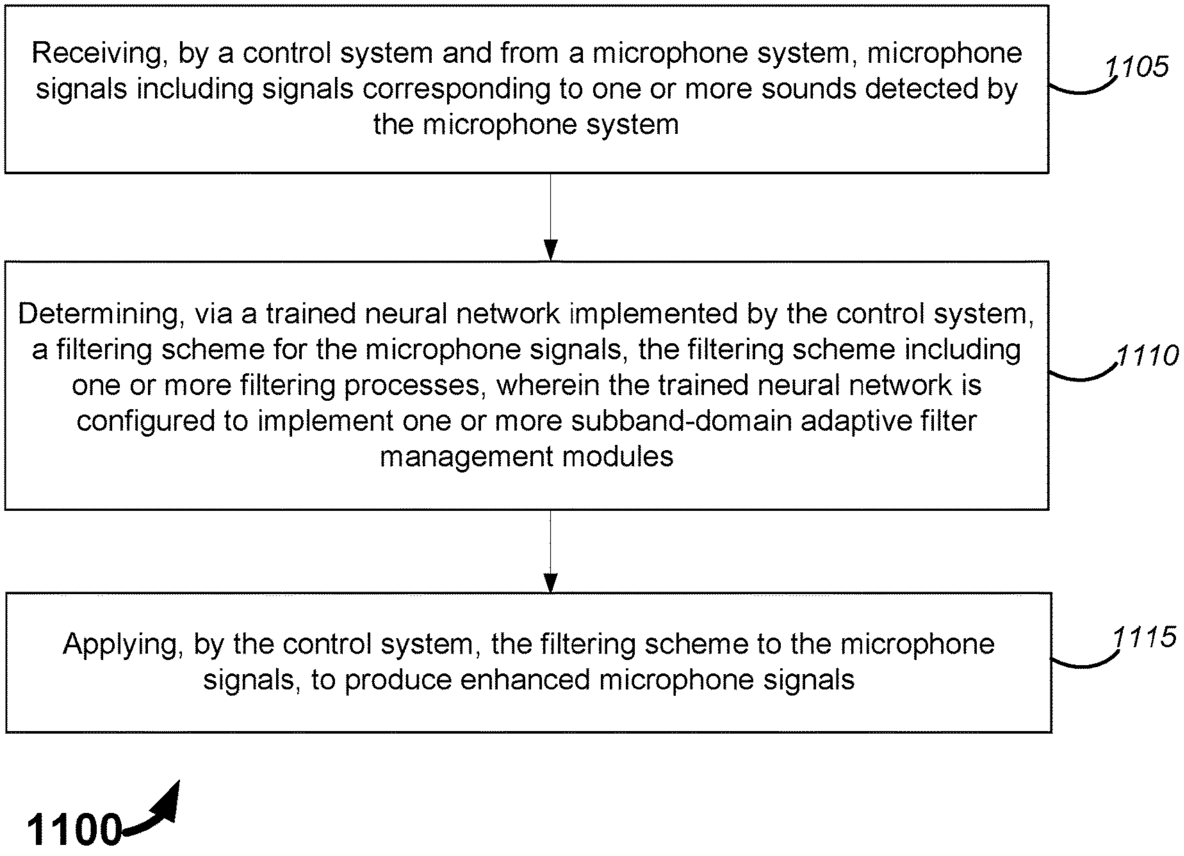
FIG. 11 is a flow diagram that outlines one example of a disclosed method.

FIG. 11 is a flow diagram that outlines one example of a disclosed method. The blocks of method 1100, like other methods described herein, are not necessarily performed in the order indicated. Moreover, such methods may include more or fewer blocks than shown and/or described. In this example, method 1100 is an audio processing method.

The method 1100 may be performed by an apparatus or system, such as the apparatus 150 that is shown in FIG. 1B and described above, the audio device 110A and components thereof that are shown in FIGS. 1A and 2-10 and described above, etc. In some such examples, the apparatus 150 includes at least the control system 160 and the microphone system 170 that are shown in FIG. 1B and described above. However, in alternative examples method 1100 may be performed by an apparatus that includes a control system but no microphone system. In some such alternative examples, the apparatus that includes the control system may receive the microphone signals from another device. In some examples, the blocks of method 1100 may be performed by one or more devices within an audio environment, e.g., by an audio system controller (such as what is referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 1100 may be performed by a device that implements a cloud-based service, such as a server.

In this example, block 1105 involves receiving, by a control system, microphone signals from a microphone system. In this example, the microphone signals include signals corresponding to one or more sounds detected by the microphone system.

According to this example, block 1110 involves determining, by a trained neural network implemented by the control system, a filtering scheme for the microphone signals. According to some examples, the trained neural network may be, or may include, the neural network block 510A and/or the GAF unit 810A of the present disclosure. In this example, the filtering scheme includes one or more filtering processes and the trained neural network is configured to implement one or more subband-domain adaptive filter management modules. In this example, block 1115 involves applying, by the control system, the filtering scheme to the microphone signals, to produce enhanced microphone signals.

In some examples, the control system may be further configured to implement one or more multichannel, multi-hypothesis adaptive filter blocks, such as the multi-channel, multi-hypothesis adaptive filter block (MC-MH AFB) 411A that is shown in FIG. 5. According to some such examples, the one or more subband-domain adaptive filter management modules may be configured to control the one or more multichannel, multi-hypothesis adaptive filter blocks.

In some implementations, the control system may be further configured to implement a subband-domain acoustic echo canceller (AEC). In some such implementations, the filtering scheme may include an echo cancellation process. In some such implementations, the control system may be further configured to implement a renderer for producing rendered local audio signals and for providing the rendered local audio signals to a loudspeaker system and to the subband-domain AEC. In some such implementations, the apparatus may include the loudspeaker system. In some implementations, the control system may be configured for providing reference non-local audio signals to the subband-domain AEC. The reference non-local audio signals may correspond to audio signals being played back by one or more other devices in the audio environment.

According to some examples, the control system may be configured to implement a noise compensation module. In some such examples, the filtering scheme may include a noise compensation process. In some examples, the control system may be configured to implement a dereverberation module. In some such examples, the filtering scheme may include a dereverberation process.

In some implementations, the control system may be configured to implement a beam steering module. In some such implementations, the filtering scheme may involve, or may include, a beam steering process. In some such implementations, the beam steering process may be a receive-side beam steering process to be implemented by a microphone system.

According to some examples, the control system may be configured to provide the enhanced microphone signals to an automatic speech recognition module. In some such examples, the control system may be configured to implement the automatic speech recognition module.

In some examples, the control system may be configured to provide the enhanced microphone signals to a telecommunications module. In some such examples, the control system may be configured to implement the telecommunications module.

In some implementations, the trained neural network may be, or may include, a recurrent neural network. In some such implementations, the recurrent neural network may be, or may include, a gated adaptive filter unit. In some such implementations, the gated adaptive filter unit may include a reset gate, an update gate, a keep gate, or any combination thereof. In some implementations, the gated adaptive filter unit may include an adaptation gate.

According to some examples, the apparatus configured for implementing the method may include a square law module configured to generate a plurality of residual power signals based, at least in part, on the microphone signals. In some such examples, the square law module may be configured to generate the plurality of residual power signals based, at least in part, on reference signals corresponding to audio being played back by the apparatus and one or more other devices. According to some examples, the apparatus configured for implementing the method may include a selection block configured to select the enhanced microphone signals based, at least in part, on a minimum residual power signal of the plurality of residual power signals.

In some examples, the control system may be further configured to implement post-deployment training of the trained neural network. The post-deployment training may, in some such examples, occur after the apparatus configured for implementing the method has been deployed and activated in an audio environment.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. An audio device, comprising:

a microphone system; and a control system configured to:

receive microphone signals from the microphone system, the microphone signals including signals corresponding to one or more sounds detected by the microphone system;

determine, via a trained neural network, a filtering scheme for the microphone signals, the filtering scheme including one or more filtering processes, wherein the trained neural network is configured to implement one or more subband-domain adaptive filter management modules, the one or more subband-domain adaptive filter management modules configured to control one or more multichannel, multi-hypothesis adaptive filter blocks;

apply the filtering scheme to the microphone signals, to produce enhanced microphone signals.

2. The audio device of claim 1, wherein the control system is further configured to implement a subband-domain acoustic echo canceller (AEC) and wherein the filtering scheme includes an echo cancellation process.

3. The audio device of claim 2, further comprising a loudspeaker system, wherein the control system is further configured to implement a renderer for producing rendered local audio signals and for providing the rendered local audio signals to the loudspeaker system and to the subband-domain AEC.

4. The audio device of claim 2, wherein the control system is configured for providing reference non-local audio signals to the subband-domain AEC, the reference non-local audio signals corresponding to audio signals being played back by one or more other audio devices.

5. The audio device of claim 1, wherein the control system is further configured to implement a noise compensation module and wherein the filtering scheme includes a noise compensation process.

6. The audio device of claim 1, wherein the control system is further configured to implement a dereverberation module and wherein the filtering scheme includes a dereverberation process.

7. The audio device of claim 1, wherein the control system is further configured to implement a beam steering module and wherein the filtering scheme includes a beam steering process.

8. The audio device of claim 1, wherein the control system is further configured to:

implement an automatic speech recognition module; and provide the enhanced microphone signals to the automatic speech recognition module.

9. The audio device of claim 1, wherein the control system is further configured to:

implement a telecommunications module; and provide the enhanced microphone signals to the telecommunications module.

10. The audio device of claim 1, wherein the trained neural network comprises a recurrent neural network.

11. The audio device of claim 10, wherein the recurrent neural network comprises a gated adaptive filter unit.

12. The audio device of claim 11, wherein the gated adaptive filter unit includes a reset gate, an update gate and a keep gate.

13. The audio device of claim 11, wherein the gated adaptive filter unit includes an adaptation gate.

14. The audio device of claim 11, further comprising a square law module configured to generate a plurality of residual power signals based, at least in part, on the microphone signals.

15. The audio device of claim 14, wherein the square law module is configured to generate the plurality of residual power signals based, at least in part, on reference signals corresponding to audio being played back by the audio device and one or more other audio devices.

16. The audio device of claim 15, further comprising a selection block configured to select the enhanced microphone signals based, at least in part, on a minimum residual power signal of the plurality of residual power signals.

17. The audio device of claim 1, wherein the control system is further configured to implement post-deployment training of the trained neural network, the post-deployment training occurring after the audio device has been deployed and activated in an audio environment.

* * * * *